US009826425B2

(12) United States Patent
Kim et al.

(10) Patent No.: US 9,826,425 B2
(45) Date of Patent: Nov. 21, 2017

(54) METHOD AND APPARATUS FOR TRANSMITTING CHANNEL STATE INFORMATION

(75) Inventors: Min Gyu Kim, Anyang-si (KR); Suck Chel Yang, Anyang-si (KR); Joon Kui Ahn, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 315 days.

(21) Appl. No.: 13/806,010

(22) PCT Filed: Jun. 20, 2011

(86) PCT No.: PCT/KR2011/004494
§ 371 (c)(1),
(2), (4) Date: Dec. 20, 2012

(87) PCT Pub. No.: WO2011/162522
PCT Pub. Date: Dec. 29, 2011

(65) Prior Publication Data
US 2013/0094392 A1    Apr. 18, 2013

Related U.S. Application Data

(60) Provisional application No. 61/357,082, filed on Jun. 21, 2010.

(51) Int. Cl.
*H04L 12/28* (2006.01)
*H04W 24/10* (2009.01)
*H04L 1/00* (2006.01)
*H04L 5/00* (2006.01)
*H04L 27/26* (2006.01)

(52) U.S. Cl.
CPC .......... *H04W 24/10* (2013.01); *H04L 1/0026* (2013.01); *H04L 1/0028* (2013.01); *H04L 5/001* (2013.01); *H04L 5/0057* (2013.01); *H04L 5/0091* (2013.01); *H04L 27/2646* (2013.01); *H04L 27/2647* (2013.01)

(58) Field of Classification Search
None
See application file for complete search history.

(56) References Cited

U.S. PATENT DOCUMENTS 7,577,206 B2    8/2009  Kim
2005/0266861 A1  12/2005  Rajkotia
(Continued)

*Primary Examiner* — Christopher Wyllie
(74) *Attorney, Agent, or Firm* — Birch, Stewart, Kolasch & Birch, LLP

(57) ABSTRACT

The present invention relates to a method for transmitting channel state information of a terminal in a multi-carrier system, and to a terminal using the method. The method comprises the steps of: receiving reference signals from a base station via a plurality of downlink component carriers; measuring a channel state for each of the plurality of downlink component carriers using the reference signals included in the plurality of downlink component carriers; generating channel state information on a portion of the plurality of downlink component carriers; and transmitting to the base station the channel state information on a portion of the plurality of downlink component carriers and/or an index which indicates the portion of the plurality of downlink component carriers.

7 Claims, 14 Drawing Sheets

(56) References Cited

U.S. PATENT DOCUMENTS

| | | | |
|---|---|---|---|
| 2010/0020852 A1* | 1/2010 | Erell | H04L 1/0026 |
| | | | 375/141 |
| 2010/0271970 A1* | 10/2010 | Pan | H04L 1/0026 |
| | | | 370/252 |
| 2010/0322185 A1* | 12/2010 | Park | H04W 72/085 |
| | | | 370/331 |
| 2011/0134771 A1* | 6/2011 | Chen | H04L 1/0027 |
| | | | 370/252 |
| 2011/0142147 A1* | 6/2011 | Chen | H04L 25/03343 |
| | | | 375/260 |
| 2011/0292911 A1* | 12/2011 | Uemura | H04W 36/0072 |
| | | | 370/331 |
| 2012/0076017 A1* | 3/2012 | Luo | H04L 1/0027 |
| | | | 370/252 |
| 2012/0106450 A1* | 5/2012 | Golitschek Edler Von Elbwart | H04L 1/003 |
| | | | 370/328 |
| 2012/0113910 A1* | 5/2012 | Jen | H04L 1/16 |
| | | | 370/329 |
| 2012/0327883 A1* | 12/2012 | Yang | H04L 1/0026 |
| | | | 370/329 |

\* cited by examiner

METHOD AND APPARATUS FOR TRANSMITTING CHANNEL STATE INFORMATION

CROSS REFERENCE TO RELATED APPLICATIONS

This application is the National Phase of PCT/KR2011/004494 filed on Jun. 20, 2011, which claims priority under 35 U.S.C. 119(e) to U.S. Provisional Application No. 61/357,082 filed on Jun. 21, 2010, all of which are hereby expressly incorporated by reference into the present application.

TECHNICAL FIELD

The present invention relates to wireless communication, and more specifically to a method and apparatus for transmitting channel state information in a wireless communication system.

BACKGROUND ART

One requirement for next-generation wireless communication systems is to be able to support a high data transmission rate. For this purpose, there is ongoing research, such as MIMO (Multiple Input Multiple Output), CoMP (Cooperative Multiple Point Transmission), or relays, but the most fundamental and stable method is to broaden bandwidth.

However, frequency resources are now in saturation, and various technologies are used to occupy a wide range of frequency bands. To meet demand for a higher data transmission and secure a broader bandwidth, the concept of carrier aggregation (CA) has been introduced which ties a number of bands into a single system and provides a design that may satisfy the basic requirement that each spread band may operate an independent system. At this time, the band which enables each independent operation is defined as a component carrier (CC).

To support increasing transmission capacity, recent communication standards, e.g., 3GPP LTE-A or 802.16m, consider expanding the bandwidth up to 20 MHz or more. In such case, one or more component carriers are aggregated to support the broadband. For example, if a single component carrier corresponds to a bandwidth of 5 MHz, four carriers are aggregated to support the maximum of a bandwidth of 20 MHz. As such, the carrier aggregation system uses multiple component carriers, and may be in this sense referred to as a "multi-carrier system".

Meanwhile, for efficient communication between a base station and user equipment, feedback of channel state information (CSI) is required. However, in a multi-carrier system, channel state information fed back from the user equipment to the base station is generated for each component carrier of the downlink and may be transmitted through one component carrier of the uplink. In such case, compared with when one carrier is conventionally used for the downlink, more channel state information need to be transmitted through one carrier of the uplink. Accordingly, it is an issue to figure out a method of being able to efficiently transmit the channel state information.

DISCLOSURE

Technical Problem

There are provided a method and apparatus for transmitting channel state information of user equipment in a wireless communication system.

Technical Solution

According to an aspect of the present invention, a method of transmitting channel status information of user equipment in a multi-carrier system includes the steps of receiving a reference signal through a plurality of downlink component carriers from a base station, measuring a channel status on each of the plurality of downlink component carriers using the reference signal included in each of the plurality of downlink component carriers, generating channel status information on some of the plurality of downlink component carriers, and transmitting to the base station at least one of channel status information on the some downlink component carriers and an index indicating the some downlink component carriers.

The some downlink component carriers may include one downlink component carrier having a best channel status among the plurality of downlink component carriers.

The channel status information on the one downlink component carrier and the index indicating the one downlink component carrier may be transmitted through one uplink component carrier.

Each of the channel status information on the one downlink component carrier and the index indicating the one downlink component carrier may be independently transmitted in a different subframe.

The channel status information may include at least one a channel quality indicator (CQI), a precoding matrix index (PMI), and a rank indicator (RI).

The method may further include the step of receiving an uplink grant from the base station, wherein the uplink grant includes a carrier indication index.

In a case where a value of the carrier indication index indicates a downlink component carrier configured in the user equipment, the some downlink component carriers may include the downlink component carrier indicated by the value of the carrier indication index.

When the value of the carrier indication index is one of reserved values, the some downlink component carriers may include one downlink component carrier having the best channel status among the plurality of downlink component carriers, and wherein the reserved values may be values of carrier indication indexes indicating downlink component carriers other than the downlink component carrier configured in the user equipment.

Channel status information on the downlink component carrier having the best channel status may be transmitted through only one configured uplink component carrier.

According to another aspect of the present invention, user equipment includes a RF (Radio Frequency) unit that transmits and receives a wireless signal and a processor connected to the RF unit, wherein the processor receives a reference signal through a plurality of downlink component carriers from a base station, measures a channel status on each of the plurality of downlink component carriers using the reference signal included in each of the plurality of downlink component carriers, generates channel status information on some of the plurality of downlink component carriers, and transmits to the base station at least one of channel status information on the some downlink component carriers and an index indicating the some downlink component carriers.

The some downlink component carriers may include one downlink component carrier having a best channel status among the plurality of downlink component carriers.

Each of the channel status information on the one downlink component carrier and the index indicating the one downlink component carrier may be independently transmitted in a different subframe.

The processor may receive an uplink grant from the base station, and wherein the uplink grant may include a carrier indication index.

When a value of the carrier indication index indicates a downlink component carrier configured in the user equipment, the some downlink component carriers may include a downlink component carrier indicated by the carrier indication index.

When the value of the carrier indication index is one of reserved values, the some downlink component carriers may include one downlink component carrier having the best channel status among the plurality of downlink component carriers, and wherein the reserved values may be values of carrier indication indexes indicating downlink component carriers other than the downlink component carrier configured in the user equipment.

Advantageous Effects

In a wireless communication system, such as a multi-carrier system, user equipment may efficiently transmit channel state information.

MODE FOR INVENTION

According to the 3GPP ($3^{rd}$ Generation Partnership Project) standardization organization, LTE (Long Term Evolution) is part of E-UMTS (Evolved-UMTS) that uses E-UTRAN (Evolved-Universal Terrestrial Radio Access Network) and adopts OFDMA (Orthogonal Frequency Division Multiple Access) for downlink and SC-FDMA (Single Carrier-Frequency Division Multiple Access) for uplink. LTE-A (Advanced) is an advanced version of LTE. Hereinafter, for clarity, the description primarily focuses on 3GPP LTE/LTE-A, but the technical spirit of the present invention is not limited thereto.

Figure 1:
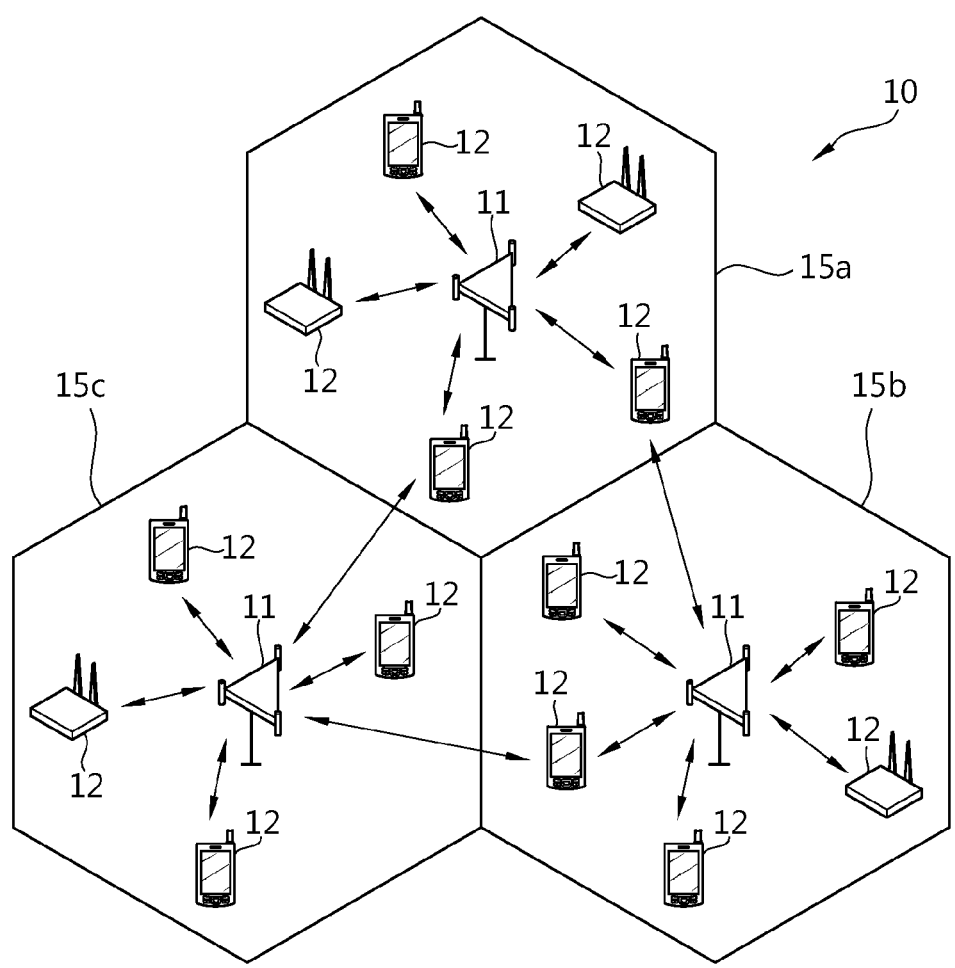
FIG. 1 illustrates a wireless communication system.

FIG. 1 illustrates a wireless communication system.

Referring to FIG. 1, the wireless communication system 10 includes at least one base station (BS) 11. Each base station 11 provides a communication service in a specific geographical area 15 that is generally called a "cell". The cell may be divided into a plurality of regions, each of which is referred to as a "sector". One base station may include one or more cells. The base station 11 generally refers to a fixed station that communicates with user equipment 12, and may be also called other terms, such as eNB (evolved NodeB), BTS (Base Transceiver System), access point, or AN (Access Network).

The user equipment (UE) 12 may be stationary or may have mobility, and may be also referred to as other terms, such as MS (Mobile Station), UT (User Terminal), SS (Subscriber Station), wireless device, PDA (Personal Digital Assistant), wireless modem, handheld device, or AT (Access Terminal).

Hereinafter, "downlink (DL)" refers to communication from the base station 11 to the user equipment 12, and "uplink (UL)" refers to communication from the user equipment 12 to the base station 11.

The wireless communication system 10 may be a system that supports bilateral communication. The bilateral communication may be performed by using a TDD (Time Division Duplex) mode or an FDD (Frequency Division Duplex) mode. The TDD mode uses different temporal resources for uplink transmission and downlink transmission. The FDD mode uses different frequency resources for uplink transmission and downlink transmission. The base station 11 and the user equipment 12 communicate with each other using wireless resources called radio frame.

Figure 2:
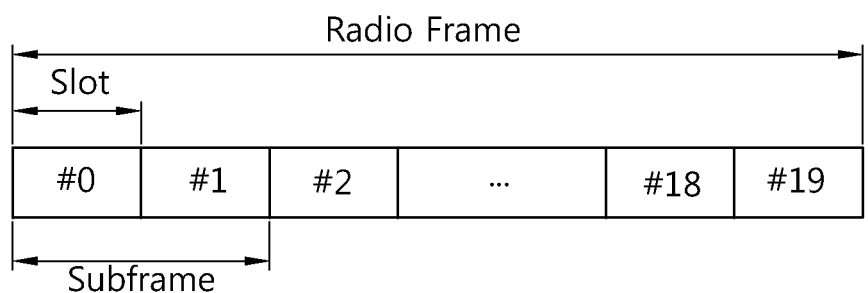
FIG. 2 illustrates a structure of a radio frame.

FIG. 2 illustrates a structure of a radio frame.

Referring to FIG. 2, the radio frame includes 10 subframes, and one subframe includes two slots. The length of one subframe may be 1 ms, and the length of one slot may be 0.5 ms. The time taken for one subframe to be transmitted is referred to as a TTI (Transmission Time Interval). The TTI may be a minimum unit for scheduling.

One slot may include a plurality of OFDM (orthogonal frequency division multiplexing) symbols in the time domain. The OFDM symbol is to represent one symbol period since 3GPP LTE uses OFDMA for downlink, and may be referred to as other terms according to multiple access schemes. For example, in the case that SC-FDMA is used for an uplink multiple access scheme, it may be referred to as SC-FDMA symbol. As an example, one slot includes 7 OFDM symbols. However, according to the length of CP (Cyclic Prefix), the number of OFDM symbols included in one slot may change. According to 3GPP TS 36.211 V8.5.0(2008-12), in the normal CP, one subframe includes 7 OFDM symbols, and in the extended CP, one subframe includes 6 OFDM symbols. The structure of the radio frame is merely an example, and the number of subframes included in the radio frame and the number of slots included in the subframe may vary.

Figure 3:
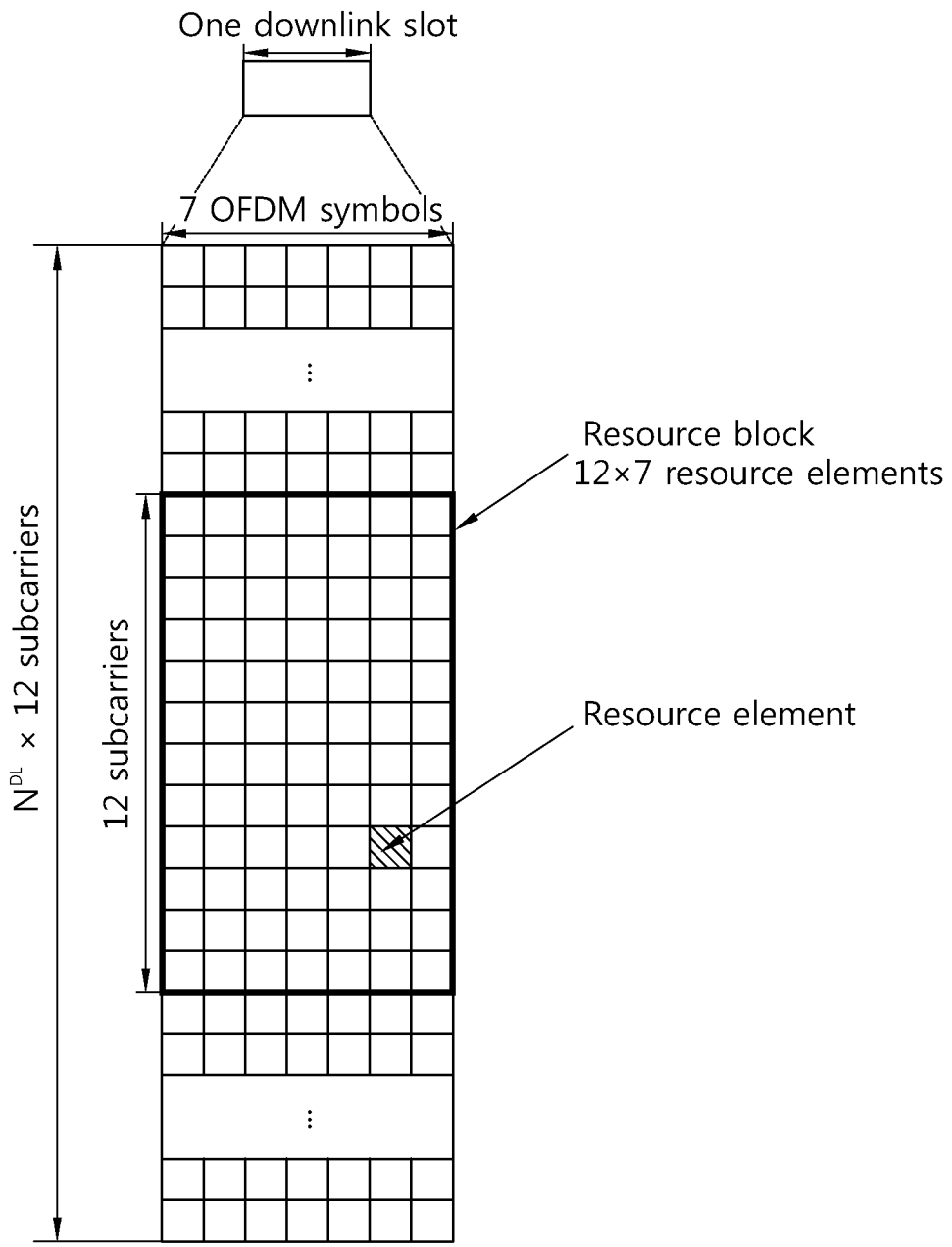
FIG. 3 illustrates an example of a resource grid for one downlink slot.

FIG. 3 illustrates an example of a resource grid for one downlink slot.

Referring to FIG. 3, the downlink slot includes a plurality of OFDM symbols in the time domain and $N_{RB}$ resource blocks (RBs) in the frequency domain. The resource block is a unit for resource allocation, and includes one slot in the time domain and a plurality of contiguous subcarriers in the frequency domain.

The number of resource blocks included in the downlink slot, $N_{RB}$, depends upon the downlink transmission bandwidth set in the cell. For example, in the LTE system, $N_{RB}$ may be one from 6 to 110. The structure of the uplink slot may be the same as the structure of the downlink slot.

Each element in the resource grid is referred to as a resource element (RE). The resource element in the resource grid may be identified by an index pair (k, l) in the slot. Here, $k(k=0, \ldots, N_{RB} \times 12-1)$ is a subcarrier index in the frequency domain, and $l(l=0, \ldots, 6)$ is an OFDM symbol index in the time domain.

In FIG. 3, as an example, one resource block consists of 7 OFDM symbols in the time domain, and 12 subcarriers in the frequency domain, so that 7×12 resource elements are included. However, the number of OFDM symbols and the number of subcarriers in the resource block are not limited thereto. The number of OFDM symbols and the number of subcarriers may vary depending on the length of CP or frequency spacing. For example, in the case of normal CP, the number of OFDM symbols is 7, and in the case of extended CP, the number of OFDM symbols is 6. The number of subcarriers in one OFDM symbol may be selected from among 128, 256, 512, 1024, 1536 and 2048.

Figure 4:
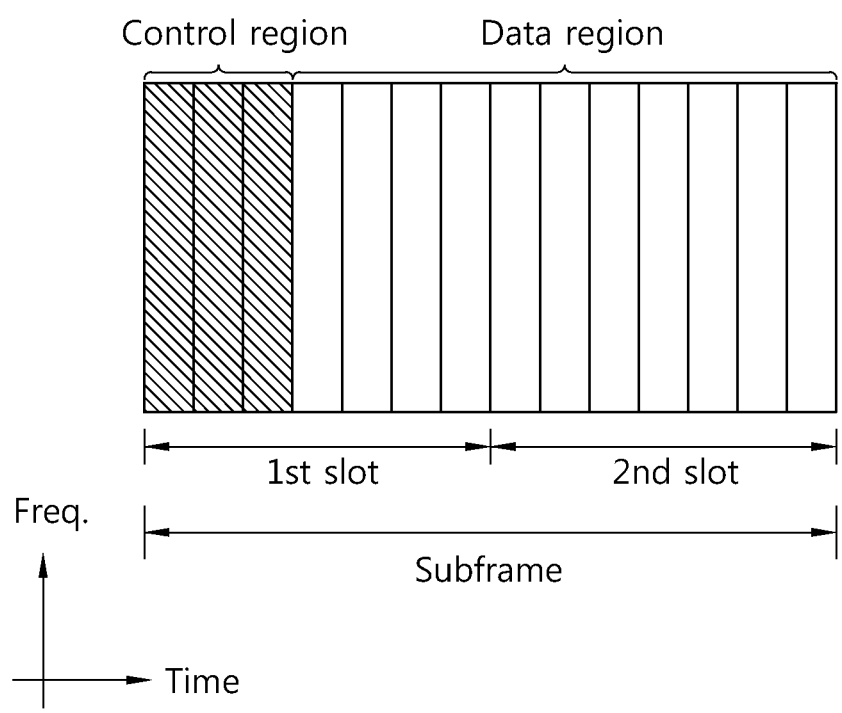
FIG. 4 illustrates an exemplary structure of a downlink subframe in 3GPP LTE.

FIG. 4 illustrates an exemplary structure of a downlink subframe in 3GPP LTE. The subframe includes two consecutive slots. The first maximally three OFDM symbols in the first slot of the downlink subframe are a control region where the PDCCH (Physical Downlink Control Channel) is assigned, and the remaining OFDM symbols are a data region where PDSCH (Physical Downlink Shared Channel) is assigned. Other than the PDCCH, control channels, such as PCFICH (Physical Control Format Indicator Channel) and PHICH (Physical Hybrid ARQ Indicator Channel) may be assigned to the control region. The user equipment decodes the control information transmitted through the PDCCH and is able to read the data information transmitted through the PDSCH. Here, the case where the control region includes three OFDM symbols is merely an example. The PDCCH conveys a downlink grant to notify resource assignment of downlink transmission over the PDSCH. More specifically, the PDCCH may transport resource allocation and transmission format of DL-SCH (Downlink Shared Channel), paging information over PCH (Paging Channel), system information over DL-SCH, resource allocation of a higher layer control message, such as a random access response transmitted over PDSCH, transmission power control command, or activation of VoIP (Voice over IP). Further, the PDCCH conveys an uplink grant to notify the user equipment of resource allocation of uplink transmission. The number of OFDM symbols included in the control region in the subframe may be known through PCFICH. The PHICH conveys HARQ (Hybrid Automatic Repeat Request) ACK (Acknowledgement)/NACK (Negative-Acknowledgement) signals in response to the uplink transmission.

Figure 5:
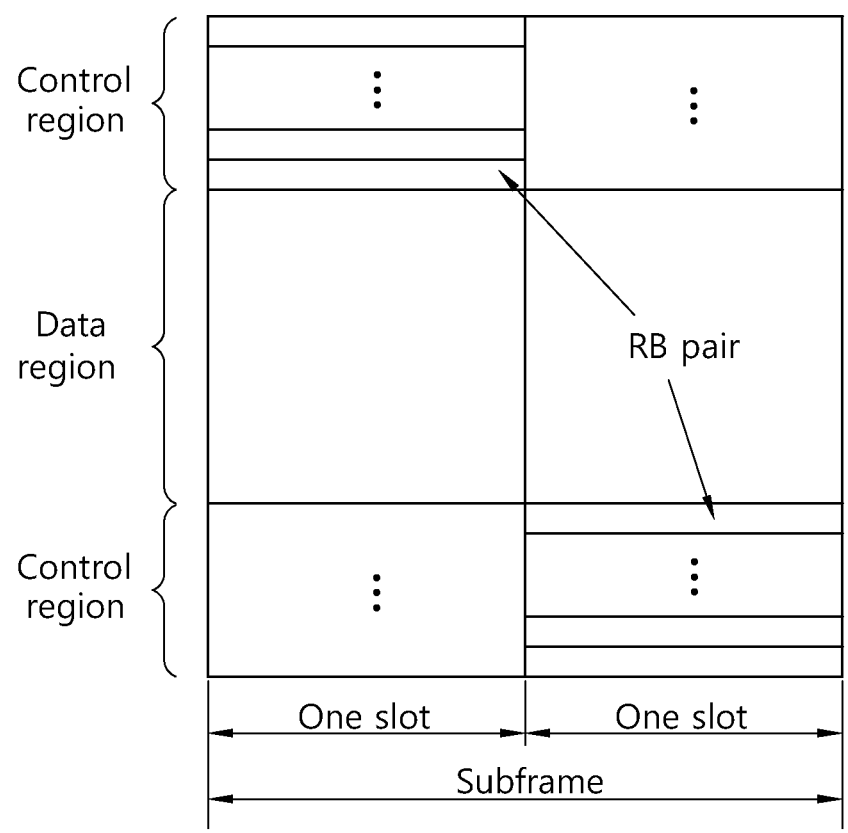
FIG. 5 illustrates a structure of an uplink subframe.

FIG. 5 illustrates a structure of an uplink subframe.

Referring to FIG. 5, the uplink subframe may be divided into a control region and a data region in the frequency domain. PUCCH (Physical Uplink Control Channel) through which uplink control information is transmitted is assigned to the control region. PUSCH (Physical Uplink Shared Channel) through which data (in some cases, together with control information) is transmitted is assigned to the data region. According to configurations, the user equipment may transmit the PUCCH and PUSCH at the same time or transmit either the PUCCH and PUSCH.

The PUCCH for one user equipment is assigned as a resource block (RB) pair in the subframe. The resource blocks included in the resource block pair occupy different subcarriers in the first slot and the second slot, respectively. The frequency occupied by the resource blocks included in the resource block pair assigned to the PUCCH change with respect to a slot boundary. This is called "RB pair assigned to the PUCCH has been frequency-hopped at the slot boundary." The user equipment may obtain a frequency diversity gain by transmitting the uplink control information through subframes different from each other according to times.

Over the PUCCH, ARQ (Hybrid Automatic Repeat reQuest) ACK (Acknowledgement)/NACK (Non-acknowledgement), channel status information (CSI) indicating the downlink channel status, for example, CQI (Channel Quality Indicator), PMI (precoding matrix index), or PTI (precoding type indicator), RI (rank indication) may be transmitted. Periodic channel status information may be transmitted through the PUCCH.

The PUSCH is mapped with the UL-SCH (Uplink Shared Channel) that is a transport channel. Uplink data transmitted over the PUSCH may be a transport block that is a data block for UL-SCH transmitted during the TTI. The transport block may include user data. Or, the uplink data may be multiplexed data. For example, the channel status information multiplexed with data may include CQI, PMI, and RI. Or, the uplink data may be constituted of the channel status information only. The periodic or aperiodic channel status information may be transmitted through the PUSCH. Hereinafter, the channel status information is described.

[Channel Status Information in Wireless Communication System]

A) Channel Status Information (CSI)

For efficient communication, channel information needs to be fed back. In general, the channel information of downlink is transmitted through the uplink, and the channel information of uplink is transmitted through the downlink. The channel information indicating the status of the channel is referred to as status information, which includes PMI, RI, or CQI.

PMI provides information on the precoding matrix in the precoding of the codebook base. PMI is associated with MIMO (Multiple Input Multiple Output). In the MIMO, when the PMI is fed back, this is referred to as closed loop MIMO. The downlink transmission modes may be classified into nine that will be described below. Among the downlink transmission modes, the PMI feedback is used in modes 4, 5, 6, and 9. Among the downlink transmission modes, mode 8 allows the user equipment to feed back the PMI when PMI/RI report is configured.

1) single antenna port: in this mode, no precoding is performed.

2) transmission diversity: the transmission diversity may be used in two or four antenna ports that use SFBC.

3) open loop spatial multiplexing: open loop mode in which RI feedback-based rank adaptation is possible. In the case that rank is 1, the transmission diversity may apply. In the case that rank is larger than 1, larger delay CDD may be used.

4) closed loop spatial multiplexing: in this mode, precoding feedback that supports dynamic rank adaptation applies.

5) multi-user MIMO 6) closed loop spatial multiplexing with a single transmission layer 7) single antenna port: mode that may be used for beam forming in the case that a UE-specific reference signal is used. If the number of PBCH antenna ports is 1, a single antenna port (port 0) is used, and otherwise, transmission diversity is used.

8) dual layer transmission: dual layer transmission using antenna ports 7 and 8, or single antenna transmission using antenna port 7 or 8. Closed loop spatial multiplexing.

9) up to 8 layer transmission: up to 8 layer transmission using antenna ports 7 to 14. Closed loop spatial multiplexing.

RI is information on the number of layers recommended by the user equipment. That is, RI refers to the number of independent streams used for spatial multiplexing. RI is fed back only when the user equipment operates only in the MIMO mode that uses spatial multiplexing. That is, RI is fed back only in modes 3, 4, 8, and 9 among the above-described downlink transmission modes. For example, in the single antenna port mode or transmission diversity mode, RI is not fed back. RI may have 1 or 2 in, e.g., 2×2 antenna configuration, and one of 1 to 4 in the 4×4 antenna configuration. RI is associated with feedback of one or more CQIs all the time. That is, the CQI fed back is calculated with a specific RI value assumed. Since the rank of a channel generally changes slower than CQI, RI is fed back a smaller number of times than CQI. The transmission period of RI may be a multiple of the transmission period of CQI/PMI. RI is given over the entire system band, and frequency-selective RI feedback is not supported.

CQI provides information on a link adaptive parameter that may be supported by the user equipment within a given time. CQI may indicate a data rate that may be supported by the downlink channel in consideration of an SINR (Signal to Interference Plus Noise Ratio) and characteristics of the receiver of the user equipment. The base station may determine the coding rate and modulation scheme (QPSK, 16-QAM, or 64-QAM) that is to apply to the downlink channel by using CQI. CQI may be generated by various methods. For example, there are a method of quantizing and feeding back the channel status as is, a method of calculating and feeding back the SINR (Signal to Interference Plus Noise Ratio), and a method of notifying the status that actually applies to the channel, such as MCS (Modulation Coding Scheme).

In the case that CQI is generated based on MCS, MCS includes a modulation scheme, an encoding scheme, and coding rates according thereto. Accordingly, if the modulation scheme and encoding scheme change, CQI should also change, so that at least one CQI per codeword is required.

When the MIMO (Multi Input Multi Output) applies to the wireless communication system, the number of CQIs necessary also changes. That is, since the MIMO system uses a multi-antenna to generate multi-channel, a plurality of codewords may be commonly used. Accordingly, a plurality of CQIs should be used. In the case that the plurality of CQIs are used, the amount of control information increases proportionally.

Figure 6:
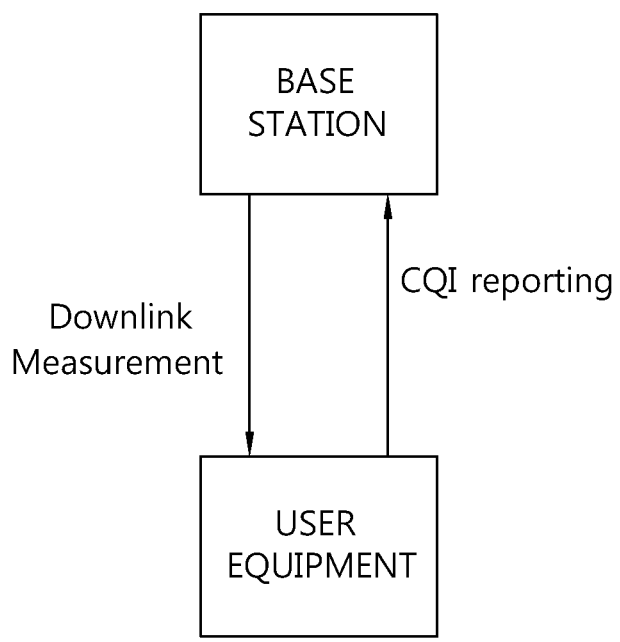
FIG. 6 illustrates a concept of CQI generation and transmission.

FIG. 6 illustrates a concept of CQI generation and transmission.

Referring to FIG. 6, the user equipment measures the downlink channel status and notifies the CQI value selected based thereon to the base station through the control channel. The base station performs downlink scheduling (user equipment selection or resource allocation) according to the notified CQI. Here, the CQI value may be SINR, CINR (Carrier to Interference and Noise Ratio), BER (Bit Error Rate), and FER (Frame Error Rate) of the channel, and values obtained by converting them to transmissible data. In the case of MIMO systems, other than CQI, the above-described PMI or RI may be added as channel status information that reflects channel statuses.

B) Characteristics of CQI in the Frequency Band

To maximally utilize given channel capacity, the wireless communication system uses link adaptation and adjusts MCS and transmission power according to the given channel. For the base station to perform such link adaptation, it is necessary to feed back channel status information of the user equipment.

If the frequency band used in the wireless communication system has a bandwidth more than a coherence bandwidth, the channel drastically changes in the bandwidth. In particular, in case of using OFDM, several subcarriers are present in the given bandwidth, and since modulated symbols are transmitted through the subcarriers, respectively, the optimal channel transmission is to perform transmission with the channel status reflected on each subcarrier. For this purpose, in the wireless communication system having a plurality of subcarriers, the amount of channel status information fed back sharply increases, and various methods have been suggested to reduce such overhead.

C) CQI Generating Scheme

Schemes suggested to reduce overhead according to an increase in the channel state information (e.g., CQI) transmitted are briefly described.

First, a scheme to change the unit of transmission of channel state information. For example, in OFDM, the channel state information is transmitted for each subcarrier. However, this scheme groups bundles several subcarriers into a single subcarrier group, so that the channel state information is transmitted on a per-subcarrier group basis. For example, if in the OFDM scheme using 2048 subcarriers, 12 subcarriers are put together into a single subcarrier group, total 171 subcarrier groups are created, so that the amount of channel state information actually transmitted decreases from 2048 counts to 171 counts.

In the method in which when a frequency band is separated into an integer number of subcarriers as in the OFDM scheme, one or more subcarriers is bundled into a single subcarrier group, and each CQI is notified per subcarrier group, the basic unit is defined as a CQI subcarrier group or CQI subband. Meanwhile, in the case that the frequency band is not separated into each subcarrier, the entire frequency band is divided into some frequency bands, and CQI is generated with respect to the divided frequency bands. The divided frequency bands for generating the CQI are defined as CQI subbands.

Second, a method of compressing and generating channel state information. For example, this method compresses CQI per subcarrier and transmits the compressed CQI in the OFDM scheme. As a compressing scheme, e.g., DCT (Discrete Cosine Transform), may be considered.

Finally, a method of generating channel state information by selecting a frequency band. For example, a best-M scheme chooses the best M (M is a natural number) subcarriers among subcarriers or in a subcarrier group and transmits the chosen M subcarriers rather than transmitting channel information for each and every subcarrier in the OFDM scheme. Data actually transmitted when the frequency band is selected and corresponding CQI is transmitted may be largely divided into two portions. The first portion corresponds to CQI value, and the second portion corresponds to CQI index portion.

D) Frequency Band Selective CQI Generating Scheme

Figure 7:
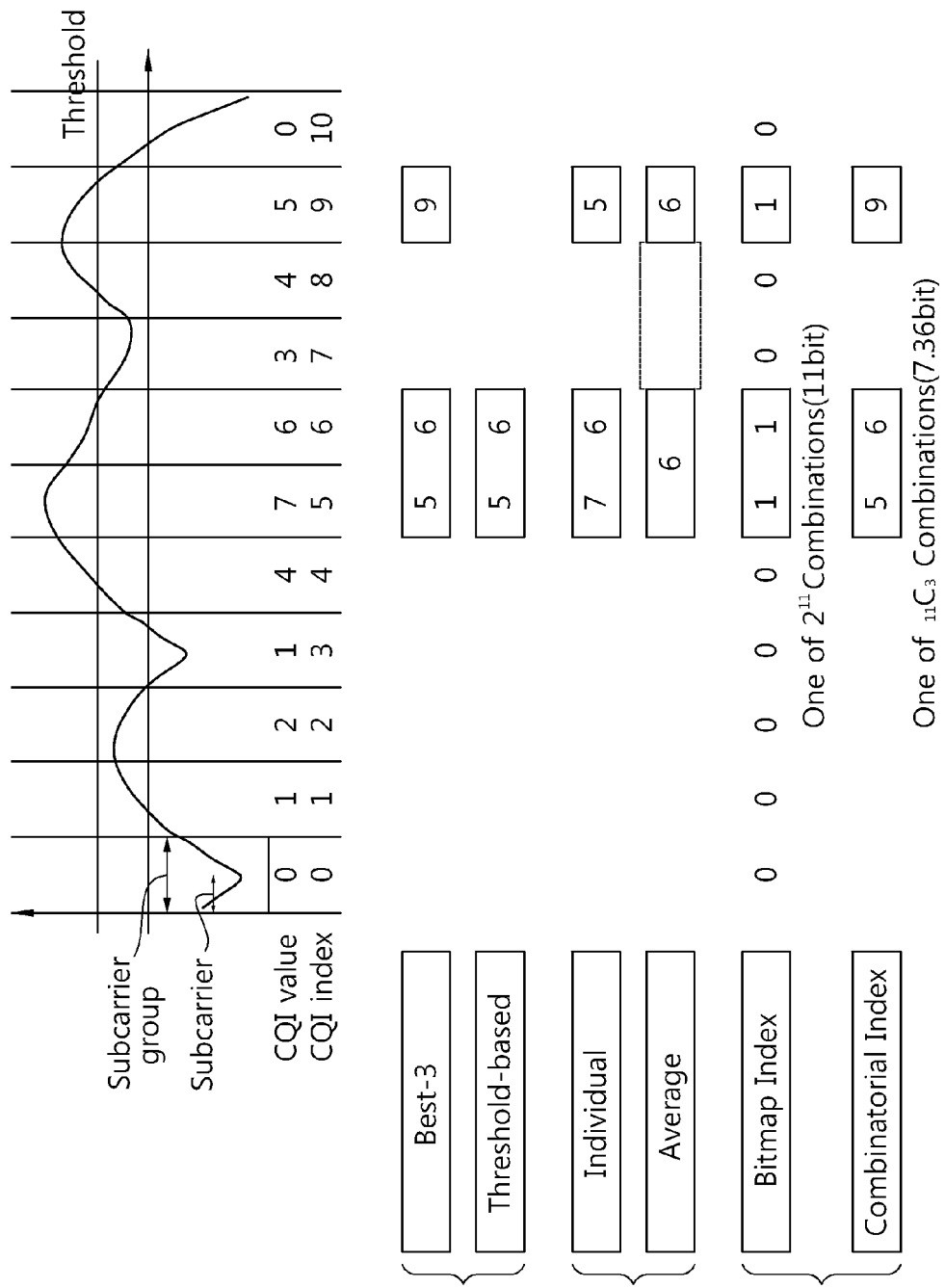
FIG. 7 illustrates schemes of generating CQI by selecting CQI subband in the frequency domain.

FIG. 7 illustrates schemes of generating CQI by selecting CQI subband in the frequency domain.

Referring to FIG. 7, the frequency band selective CQI generating scheme largely consists of three parts. The first part is a method of selecting a frequency band to generate CQI, i.e., CQI subband. The second part is to manipulate CQI values of the selected frequency bands and to generate and transmit the CQI. The third part is to transmit the selected frequency band, i.e., indexes of CQI subbands.

First, the method of selecting the CQI subband includes, for example, a best-M scheme and a threshold-based scheme. The best-M scheme is a method of selecting M CQI subbands having an excellent channel status. In the case that M is 3, three CQI subbands having indexes 5, 6, and 9 with a good channel status are selected. The threshold-based scheme is to select CQI subbands having a better channel status than a predetermined threshold value. In FIG. 7, CQI subbands having indexes 5 and 6 higher than the threshold value are selected.

Second, the method of generating and transmitting CQI values includes, for example, an individual transmission scheme and an average transmission scheme. The individual transmission scheme is a method of transmitting all the CQI values of the selected CQI subbands. Accordingly, in the individual transmission scheme, as the number of the selected CQI subbands increases, the CQI values to be transmitted also increases. In the average transmission scheme, an average of CQI values of the selected CQI subbands is transmitted. Accordingly, in the average transmission scheme, irrespective of the number of the selected CQI subbands, there is one CQI value to be transmitted. On the contrary, as the average of several CQI subbands is transmitted, accuracy is lowered. The average calculated in the average transmission scheme may be an arithmetic average or an average considering channel capacity.

Third, the method of transmitting the index of the CQI subband includes, for example, a bitmap index scheme and a combinatorial index scheme. In the bitmap index scheme, one bit is assigned to each CQI subband, and when a specific CQI subband is used, one bit of the corresponding CQI subband is assigned 1, or otherwise 0 (of course, it may be also assigned 1 when not used and 0 when used), thereby indicating what CQI subband is used. In the bitmap index scheme, as many bits as the total number of CQI subbands are necessary, but irrespective of how many CQI subbands are used, a constant number of bits are always used to represent the corresponding CQI subband. In the combinatorial index scheme, the number of CQI subbands to be used is determined, and each index is mapped with as many combinatorial cases as the number of CQI subbands used among the total CQI subbands. For example, in the case that total N CQI subbands are present among which M (N and M each is a natural number, and N is equal to or more than M) CQI subband indexes are used, the total number of possible combinations is as follows:

$$_NC_M = \frac{N!}{(N-M)!M!} \quad \text{[Equation 1]}$$

The number of bits to represent the total number of possible combinations as in Equation 1 is as follows:

$$\lceil \log_2(_NC_M) \rceil = \left\lceil \log_2\left(\frac{N!}{(N-M)!M!}\right) \right\rceil \quad \text{[Equation 2]}$$

Since in the exemplary method described in connection with FIG. 7 among total 11 CQI subbands three CQI subbands are selected, the total number of possible combinations is $_{11}C_3=165$, and the number of bits to represent the 165 combinations is 8.

E) increase in CQI transmission amount in several aspects

The number of CQIs transmitted may increase in various aspects, thus causing large overhead.

First, increase of CQIs in the spatial aspect is as follows. In MIMO, several codewords may be transmitted through several layers. At this time, several CQIs are necessary. For example, in 3GPP LTE, in MIMO maximally two codewords are available, and at this time, two CQIs are needed. If one CQI consists of four bits and two codewords are present, the CQI consists of total eight bits. Since such CQI is transmitted by all the user equipment that should feed back the channel status, it takes up a lot in terms of all the wireless resources. Accordingly, it is preferable to reduce the CQI to the minimum amount in terms of channel capacity.

Second, increase of CQI in the frequency aspect is as follows. The above-described CQI corresponds to only a single frequency band. If the frequency band exhibiting the best channel status is selected and only the CQI for the selected frequency band is transmitted at the receiving side (user equipment), and services are provided through the selected frequency band at the transmission side (base station), the CQI requires only one frequency band. Such case is appropriate for a single user environment, but not for a multi-user environment, which thus needs a more efficient way. In the case that only CQI for one preferred frequency band is transmitted, if the frequency bands favored by a plurality of users do not overlap, it doesn't matter. However, if a specific frequency band is selected as a frequency band preferred by the plurality of users at the same time, it would be problematic. In such case, users other than a selected specific user cannot use the corresponding frequency band. If each user transmits only the CQI for one preferred frequency band, the users not selected by the base station are fundamentally cut off the chance of receiving services. Accordingly, to address such problems and to efficiently obtain multi-user diversity gain, it is required to transmit CQI for a number of frequency bands. In the case that CQI corresponding to a number of frequency bands is transmitted, the amount of CQI information transmitted increases. For example, if three frequency bands are selected in an order of providing a better channel status and CQI and frequency band indicator for each frequency band are transmitted, the amount of CQI transmitted triples while additional transmission is needed for the indicators to indicate the selected frequency bands.

Third, in the aspect considering both space and frequency, CQI may increase. That is, in the spatial aspect, a number of CQIs are needed, and in the frequency aspect, a number of CQIs may be sometimes needed.

Finally, in other aspects, CQI may increase. For example, when using CDMA (Code Division Multiple Access), a change in signal strength and interference occurs for each spreading code, and thus, CQI per spreading code may be supposed to be considered. Accordingly, CQI may increase in the code aspect. Besides, CQI may increase in various aspects.

As described above, to reduce the growing amount of CQI transmitted, differential CQI (delta CQI) may be used.

F) Differential CQI

The situations where a number of CQIs are needed in diverse aspects have been described above. As such, in the case that several CQIs are required, differential CQI may be used to reduce the amount of CQI transmitted. That is, one reference CQI is selected, and the reference CQI is normally transmitted. However, for the other CQIs, only the differences between the CQIs and the reference CQI are transmitted. That is, a similar scheme to differential modulation among modulation/demodulation schemes is used. Here, in the case that several CQIs are represented in the differential scheme, more bits are generally assigned to the reference CQI while relatively fewer bits are assigned to the other CQIs, thereby resulting in a decrease in the entire amount of CQI transmitted.

G) CQI Transmission Mode

In the 3GPP LTE system, uplink channels used for CQI transmission are as in Table 1 below:

TABLE 1

| scheduling scheme | periodic CQI transmission | aperiodic CQI transmission |
|---|---|---|
| frequency non-selective | PUCCH | |
| frequency selective | PUCCH | PUSCH |

As shown in Table 1, CQI may be transmitted through PUCCH at a period determined by the higher layer, or may be transmitted through PUSCH aperiodically as required by the scheduler. Transmission through PUSCH is available only in the frequency selective situation.

1) transmission of CQI/PMI/RI through PUSCH after receiving CQI request signal.

In this case, PUSCH scheduling control signal (UL grant) transmitted through PDCCH includes a control signal (CQI request) that requests transmission of CQI. Table 2 below shows exemplary modes when CQI/PMI/RI are transmitted through PUSCH.

TABLE 2

| | | PMI Feedback Type | | |
|---|---|---|---|---|
| | | No PMI | Single PMI | Multiple PMI |
| PUSCH CQI feedback type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

The transmission modes in Table 2 may be instructed by a higher layer signal transmitted by the base station, and CQI/PMI/RI may be all transmitted through the PUSCH of the same subframe. Mode 1-2, mode 2-0, mode 2-2, mode 3-0, and mode 3-1 in Table 2 are described.

1-1) Mode 1-2

Under the assumption that for each subband, data is transmitted through only the corresponding subband, precoding matrix is selected. The user equipment generates CQI by assuming a precoding matrix selected for system band or all of the bands (which is referred to as aggregation S) designated by a higher layer signal.

The user equipment transmits CQI and PMI value of each subband. At this time, the size of each subband may vary depending on the size of the system band.

1-2) Mode 2-0

The user equipment selects M preferred subbands among the system band or the bands (band aggregation S) designated by the higher layer signal. The user equipment generates one CQI under the assumption that data has been transmitted through the selected M subbands. The user equipment generates an additional CQI (wideband CQI) for the system band or band aggregation S.

In the case that there are several codewords for the selected M subbands, the CQI value for each codeword is defined in a differential manner. 'The Differential CQI'='index corresponding to the CQI values for the selected M subbands'−' wideband CQI index'.

The user equipment transmits information on the positions of the selected M subbands, one CQI value for the selected M subbands, and CQI values generated for the system band or band aggregation S. At this time, the subband size and M may vary depending on the size of the system band.

1-3) Mode 2-2

The user equipment simultaneously selects the positions of the M preferred subbands and a single precoding matrix for the M preferred subbands under the assumption that data is transmitted through the M preferred subbands.

The CQI values for the M preferred subbands are defined for each codeword. The user equipment generates an additional wideband CQI value for the system band or the band aggregation S.

The user equipment transmits information on the positions on the M preferred subbands, one CQI value for the M selected subbands, a single precoding matrix index (PMI) for the M preferred subbands, wideband precoding matrix index, and wideband CQI value. At this time, the subband size and M may vary depending on the size of the system band.

1-4) Mode 3-1

The user equipment generates a wideband CQI value. The user equipment generates the CQI value for each subband under the assumption that data is transmitted through each subband. At this time, although RI>1, only the CQI value for the first codeword comes up.

1-5) Mode 3-1

A single precoding matrix is generated for the system band or band aggregation S. The user equipment generates the CQI for the subband per codeword, with the single precoding matrix generated earlier assumed for each subband. The user equipment may generate the wideband CQI while assuming a single precoding matrix.

The CQI value of each subband is represented in the differential form. That is, 'subband CQI'='subband CQI index'−'wideband CQI index'. The subband size may vary depending on the size of the system band.

2) transmission of CQI/PMI/I through Periodic PUCCH

CQI information may be periodically transmitted through PUCCH or in some cases through PUSCH. Even when transmitted through PUSCH, CQI/PMI/RI are generated in one of the modes defined in Table 3 below and transmitted.

TABLE 3

| | | PMI Feedback Type | |
| --- | --- | --- | --- |
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

In Table 3, in case of mode 2-0 or mode 2-1, the corresponding bandwidth part BP is an aggregation of subbands consecutively positioned and may cover the system band or the entire band aggregation S. The size of each subband, BP size, and the number of BPs may vary depending on the size of the system band. Further, in the frequency domain, the CQIs are transmitted in an ascending order for each BP so as to cover the system band or band aggregation S.

According to the combination of CQI/PMI/RI transmitted, the following four transmission types may be present. Type 1: subband CQIs (SB-CQIs) of mode 2-0 and mode 2-1 are transmitted. Type 2: wideband CQI and PMI (WB-CQI/PMI) are transmitted. Type 3: RI is transmitted. Type 4: wideband CQI is transmitted.

In the case that RI and wideband CQI/PMI are transmitted, they are transmitted through subframes having different periods and offsets, and in the case that RI and the wideband CQI/PMI are set to be transmitted through the same subframe, CQI/PMI are not transmitted.

The period of the wideband CQI/PMI and subband CQI is P, and may have the following characteristics. The wideband CQI/PMI may have a period of H*P. At this time, H=J*K+1, where J is the number of frequency bands, and K is the number of all the cycles in the frequency band. That is, the wideband CQI/PMI may be transmitted at {0, H, 2H, . . . }. At J*K times other than times that the wideband CQI/PMI are transmitted, the subband CQI may be transmitted.

The period of RI is M times more than the period of the wideband CQI/PMI, and may have the following characteristics. The offset of the RI and wideband CQI/PMI may be 0. In the case that the RI and CQI/PMI are transmitted through the same subframe, the wideband CQI/PMI may not be transmitted.

The above-described parameters P, H, K, and O are all determined by the higher layer and signaled.

Each of the modes in Table 3 is described.

2-1) Mode 1-0

In the case that RI is transmitted, RI is generated for the system band or band aggregation S, and type 3 report is transmitted. In the case that CQI is transmitted, the wideband CQI is transmitted.

2-2) Mode 1-1

In the case that RI is transmitted, RI is generated for the system band or band aggregation S, and type 3 report is transmitted. In the case that CQI/PMI are transmitted, a single precoding matrix is selected with the RI most recently transmitted assumed. Type 2 report, which consists of wide CQI, single precoding matrix, and differential wide CQI, is transmitted.

2-3) Mode 2-1

In the case that RI is transmitted, RI is generated for the system band or band aggregation S, and type 3 report is transmitted. In the case that the wide CQI is transmitted, the wide CQI is generated with the RI most recently transmitted assumed, and type 4 report is transmitted. In the case that CQI for the selected subband is transmitted, the user equipment selects the most preferred subband for J BPs consisting of N subbands and transmits type 1 report. The type 1 report may need one or more subframes depending on BP.

2-4) Mode 2-1

In the case that RI is transmitted, RI is generated for the system band or band aggregation S, and type 3 report is transmitted. In the case that the wide CQI is transmitted, the wide CQI is generated with the RI most recently transmitted assumed, and type 4 report is transmitted. In the case that CQIs for the selected subbands are transmitted, the user equipment generates a single CQI value for the selected subbands in J BPs consisting of $N_j$ counts by assuming the PMI/RI most recently transmitted, and in the case that RI is larger than 1, generates differences between CQIs of the codewords by assuming the RI most recently transmitted and use of a single precoding matrix for the selected subbands and transmits type 1 report.

For what has been described above with reference to Tables 1 to 3, refer to '3GPP TS 36.213 V8.7.0(2009-05), section 7.2'. Hereinafter, a multi-carrier system according to the present invention is described.

[Multi-Carrier System]

Figure 8:
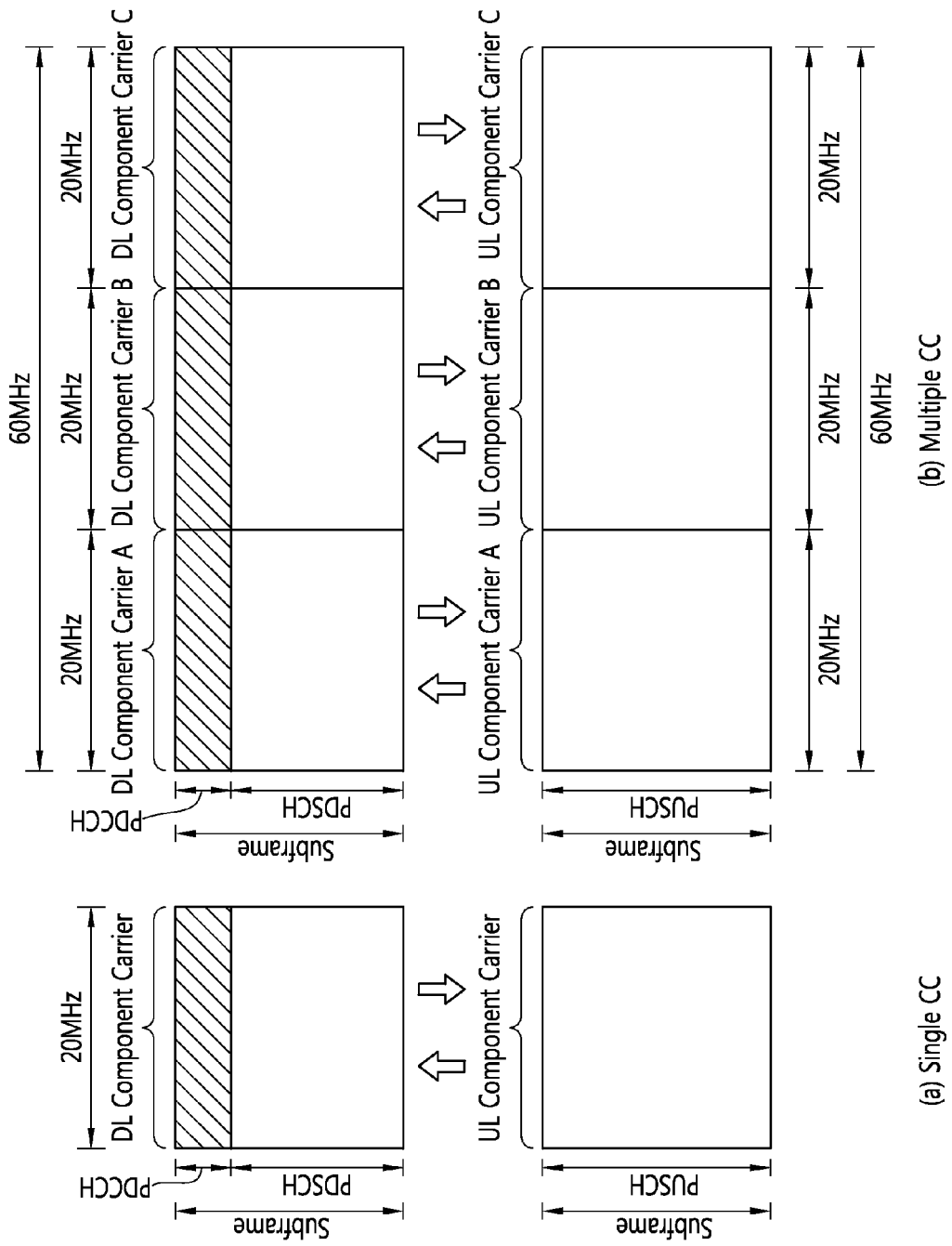
FIG. 8 illustrates an example of comparison between an existing single carrier system and a multi-carrier system.

FIG. 8 illustrates an example of comparison between an existing single carrier system and a multi-carrier system.

Referring to FIG. 8, in the single carrier system, only one carrier is supported for uplink and downlink with respect to the user equipment. Various bandwidths may be provided for the carrier, but only one carrier is assigned to the user equipment. On the contrary, in the multi-carrier system, a plurality of component carriers (DL CC A to C, and UL CC A to C) may be assigned to the user equipment. For example, three component carriers each having a frequency of 20 MHz may be assigned to the user equipment, so that a bandwidth of 60 MHz is assigned to the user equipment.

The multi-carrier system may be divided into a contiguous carrier aggregation system having carriers contiguous to each other and a non-contiguous carrier aggregation system having carriers away from each other. Hereinafter, when simply referred to as multi-carrier system, it should be construed as including both when the component carriers are contiguous to each other and when the component carriers are not contiguous to each other.

When one or more component carriers are aggregated, target component carriers may use, as is, the bandwidth used in the existing system for backward compatibility with the existing system. For example, in the 3GPP LTE system, bandwidths of 1.4 MHz, 3 MHz, 5 MHz, 10 MHz, 15 MHz and 20 MHz are supported, and in the 3GPP LTE-A system, a wideband of 20 MHz or more may be configured using only the bandwidth used in the 3GPP LTE system. Or, without using, as is, the bandwidth of the existing system, a new bandwidth may be defined to configure a wideband.

In the wireless communication system, the system band is separated into a plurality of carrier frequencies. Here, the carrier frequency means the center frequency of a cell. Hereinafter, the cell may mean a downlink frequency resource and an uplink frequency resource. Or, the cell may mean a combination of a downlink frequency resource and an optional uplink frequency resource. Or, in the case that carrier aggregation (CA) is generally not considered, one cell may have a pair of uplink and downlink frequency resources all the time. For packet data to be transmitted/received through a specific cell, the user equipment should first complete configuration of the specific cell. Here, the "configuration" means when it is complete to receive system information necessary for data transmission/reception on the corresponding cell. For example, the configuration may include the overall process of receiving common physical parameters necessary for data transmission/reception, MAC layer parameters, or parameters necessary for a specific operation at the RRC layer. The configuration-completed cell remains in the state that transmission/reception of packets are possible immediately when receiving information indicating that packet data may be transmitted.

The configuration-completed cell may remain activated or deactivated. Here, the "activation" refers to when data is under transmission or reception or stands ready. The user equipment may monitor or receive the control channel (PDCCH) and the data channel (PDSCH) of the activated cell so as to identify the resources (which may be frequency or time) assigned thereto.

The deactivation refers to when transmission or reception of traffic data is impossible but measurement or transmission or reception of minimum information is possible. The user equipment may receive system information (SI) necessary for receiving packets from the deactivated cell. On the contrary, the user equipment does not monitor or receive the control channel (PDCCH) and the data channel (PDSCH) of the deactivated cell in order to identify resources (which may be frequency or time) assigned thereto.

The cell may be classified into a primary cell, a secondary cell, and a serving cell.

The primary cell refers to a cell that operates at a primary frequency, a cell in which the user equipment performs an initial connection establishment/reestablishment procedure with the base station, or a cell designated as a primary cell during the course of handover. The secondary cell means a cell that operates at a secondary frequency and this cell is configured once RRC connection is established and is used for providing an additional wireless resource.

The serving cell is configured as the primary cell when carrier aggregation (CA) is not configured or when the user equipment cannot provide CA. When CA is configured, the term "serving cell" is used to represent the primary cell, one of all the secondary cells, or an aggregation of a plurality of secondary cells. That is, the primary cell means one serving cell that provides security input and NAS mobility information in the state of RRC establishment or re-establishment. According to capabilities of the user equipment, at least one cell may be configured to form a serving cell aggregation together with the primary cell, and here, the at least one cell is referred to as the secondary cell. Accordingly, the aggregation of serving cells configured for one user equipment may be constituted of a single primary cell only or one primary cell and at least one secondary cell.

PCC (Primary Component Carrier) refers to a component carrier (CC) that corresponds to the primary cell. PPC is a CC through which, among other carriers, the user equipment establishes a connection or RRC connection with the base station at early time. The PCC is a special CC that is in charge of connection or RRC connection for signaling regarding a number of CCs and manages UE context information which is connection information relating to the user equipment. Further, the PCC remains activated all the time when establishing a connection with the PCC so that it is in the RRC connected mode.

SCC (Secondary Component Carrier) refers to a CC that corresponds to the secondary cell. That is, the SCC is a CC assigned to the user equipment other than the PCC, and the SCC is an extended carrier for the user equipment to assign an additional resource other than the PCC. The SCC may remain activated or deactivated.

The downlink component carrier corresponding to the primary cell is referred to as a downlink primary component carrier (DL PCC), and an uplink component carrier corresponding to the primary cell is referred to as an uplink primary component carrier (UL PCC). Further, in the downlink, a component carrier corresponding to the secondary cell is referred to as a downlink secondary component carrier (DL SCC), and in the uplink, a component carrier corresponding to the secondary cell is referred to as an uplink secondary component carrier (UL SCC).

The primary cell and the secondary cell have the following characteristics.

First, the primary cell is used for transmitting PUCCH. Second, the primary cell remains activated all the time whereas the secondary cell is a carrier that is activated/deactivated depending on a specific condition. Third, when the primary cell experiences a radio link failure (hereinafter, "RLF"), RRC reconnection is triggered, while when the secondary cell experiences the RLF, RRC reconnection is not triggered. Fourth, the primary cell may be changed by a change in security key or by a handover procedure coming with a RACH (Random Access CHannel) process. Fifth, NAS (Non-Access Stratum) information is received through the primary cell. Sixth, in the primary cell, the DL PCC and the UL PCC always constitute a pair. Seventh, a different component carrier (CC) may be configured as the primary cell for each user equipment. Eighth, procedures, such as reconfiguration, addition, or removal of the primary cell, may be conducted by the RRC layer. When adding a new secondary cell, RRC signaling may be used to transmit system information of a dedicated secondary cell.

The downlink component carrier may be constituted of a single serving cell, and the downlink component carrier and uplink component carrier may be configured to be connected, thereby constituting one serving cell. However, a single uplink component carrier alone fails to constitute a serving cell. Activation/deactivation of a component carrier is equivalent in concept to activation/deactivation of a serving cell. For example, assuming that a serving cell 1 is constituted of DL CC1, activation of the serving cell 1 means activation of DL CC1. When it is assumed that a serving cell 2 is configured so that DC CC2 is connected to UL CC2, activation of the serving cell 2 means activation of DC CC2 and UL CC2. In this sense, each component carrier may correspond to a cell.

The number of component carriers aggregated may differ between the downlink and the uplink. A situation where the number of downlink CCs and the number of uplink CCs are the same is referred to as symmetric aggregation, and a situation where the numbers are different from each other is referred to as asymmetric aggregation. Further, the sizes of CCs (i.e., bandwidth) may differ. For example, when five CCs are used to configure a band of 70 MHz, the configuration of 5 MHz CC(carrier #0)+20 MHz CC(carrier #1)+20 MHz CC(carrier #2)+20 MHz CC(carrier #3)+5 MHz CC(carrier #4) may be made.

As described above, unlike in the single carrier system, in the multi-carrier system, a plurality of component carriers (CC) may be supported. That is, one user equipment may receive a plurality of PDSCHs through a plurality of DL CCs.

The multi-carrier system may support cross-carrier scheduling. The cross-carrier scheduling is a scheduling scheme that may perform resource allocation of PDSCH transmitted via a different component carrier through PDCCH transmitted via a specific component carrier and/or may perform resource allocation of PUSCH transmitted via a component carrier other than a component carrier basically linked to the specific component carrier. That is, the PDCCH and PDSCH may be transmitted through different downlink CCs, and the PUSCH may be transmitted through an uplink CC other than an uplink CC linked to the downlink CC through which the PDCCH including a UL grant is transmitted. As such, a system supporting the cross-carrier scheduling needs an indicator notifying the PDSCH/PUSCH through which the PDCCH provides control information are transmitted through which DL CC/UL CC. The field including such carrier indicator is hereinafter referred to as carrier indication field (CIF).

The multi-carrier system supporting the cross-carrier scheduling may include the carrier indication field (CIF) in the conventional DCI (downlink control information) format. In a system supporting the cross-carrier scheduling, For example, LTE-A system, the CIF is added to the existing DCI format (i.e., DCI format used in LTE), and thus, one to three bits may expand, and the PDCCH structure may reuse the existing coding scheme, and resource allocation scheme (i.e., CCE-based resource mapping).

Figure 9:
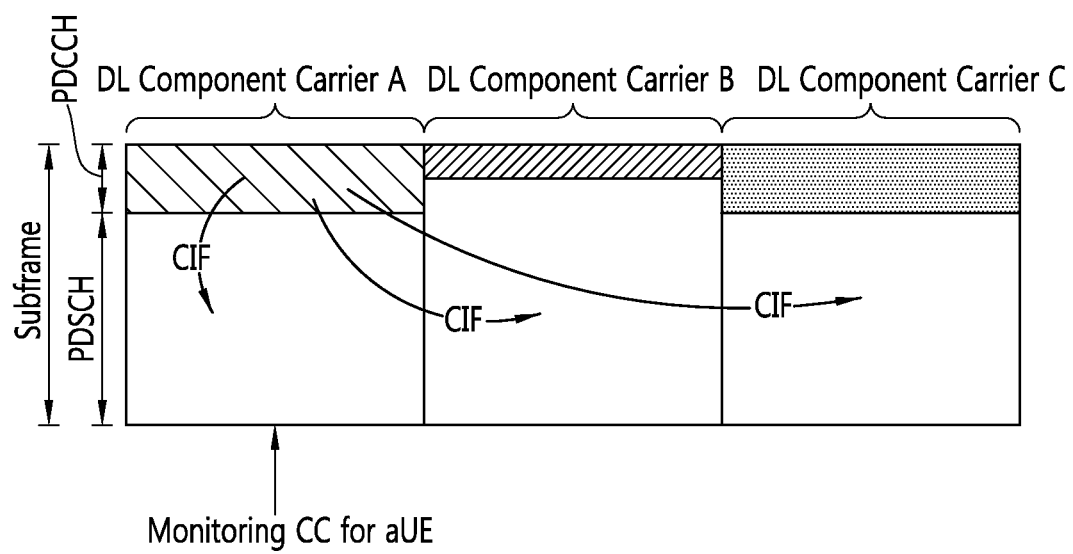
FIG. 9 illustrates an exemplary structure of a subframe for cross carrier scheduling in a multi-carrier system.

FIG. 9 illustrates an exemplary structure of a subframe for cross carrier scheduling in a multi-carrier system.

Referring to FIG. 9, the base station may configure a PDCCH monitoring DL CC aggregation. The PDCCH monitoring DL CC aggregation consists of some of all the DL CCs aggregated, and if cross-carrier scheduling is configured, the user equipment performs PDCCH monitoring/decoding only on the DL CC included in the PDCCH monitoring DL CC aggregation. In other words, the base station transmits the PDCCH for the PDSCH/PUSCH to be scheduled through only the DL CC included in the PDCCH monitoring DL CC aggregation. The PDCCH monitoring DL CC aggregation may be configured UE-specifically, UE group-specifically, or cell-specifically.

In FIG. 9, three DL CCs (DL CC A, DL CC B, and DL CC C) are aggregated, and DL CC A is configured as the PDCCH monitoring DL CC, as an example. The user equipment may receive a DL grant for the PDSCH of DL CC A, DL CC B, and DL CC C through PDCCH of DL CC A. DCI transmitted through the PDCCH of DL CC A includes the CIF and thus is able to indicate which DL CC the DCI is for.

Hereinafter, a method of transmitting channel status information in a multi-carrier system is described.

Various types of channel status information may be transmitted from the user equipment. The following table shows examples of channel status information transmitted from the user equipment.

WB-CQI (wide band-CQI)/PMI, and SB-CQI (subband-CQI). In the multi-carrier system, e.g., LTE-A, new channel status information may be introduced to enhance performance through more accurate channel adaptation than in LTE-A, and inter-cell cooperative multi-point transmission/reception (COMP) considering inter-cell interference. For example, the existing PMI may be used, divided into long-term PMI and short-term PMI. The long-term PMI may be PMI that is transmitted at a relatively long period, for example, PMI for the overall band in the system. The short-term PMI may be PMI transmitted at a relatively short period, for example, PMI for a subband of the overall band in the system. The short-term PMI may be used to more fine specify the long-term PMI. The base station may use both the long-term PMI and the short-term PMI to determine a precoding matrix used for transmitting a downlink signal to the user equipment.

As such, in the case that new channel status information is added, the transmitted channel status information type (CSI type) increases compared with the existing wireless communication system as exemplified in LTE-A of Table 4, and as in cases #1 to #8, various transmission periods may be set for each channel status information.

In Table 4, in the case that CSI type N (N is a natural number) has a larger transmission period than CSI type N+1, CSI type N has higher priority than CSI type N+1. The meaning of "higher priority" is associated with what type of channel status information is to be transmitted when different types of channel status information have been configured to be transmitted in the same subframe, but simultaneous transmission is difficult. That is, the channel status information having a higher priority is transmitted preferentially.

In the multi-carrier system, the base station may transmit a downlink signal to the user equipment by using a plurality of DL CCs. Accordingly, the user equipment may be requested to feed back channel status information on the plurality of DL CCs to the base station. As in the conventional LTE, in the case that the user equipment periodically transmits channel status information through the uplink control channel (PUCCH), configuration information for transmitting the channel status information on the plurality of DL CCs is needed. The configuration information may include, e.g. information on the transmission period of the channel status information and information on configuring a transmission mode. In the multi-carrier system, the configuration information may be configured per DL CC or per DL CC group. The PUCCH index for transmitting channel status

TABLE 4

|  |  | Rel-8 | LTE-A | | | | | | | |
|---|---|---|---|---|---|---|---|---|---|---|
|  |  | LTE | Case #1 | Case #2 | Case #3 | Case #4 | Case #5 | Case #6 | Case #7 | Case #8 |
| CQI period increase | CSI Type 1 | RI | RI |  | L-PMI | RI/L-PMI | RI | L-PMI | RI/L-PMI | RI | L-PMI |
|  | CSI Type 2 | WB-CQI/PMI | L-PMI | RI | WB-CQI/S-PMI | L-PMI | RI | WB-CQI | WB-CQI/L-PMI | WB-CQI/RI |
|  | CSI Type 3 | SB-CQI | WB-CQI/S-PMI | WB-CQI/S-PMI | SB-CQI | WB-CQI | WB-CQI | SB-CQI/S-PMI | SB-CQI/S-PMI | SB-CQI/S-PMI |
|  | CSI Type 4 |  | SB-CQI | SB-CQI |  | SB-CQI/S-PMI | SB-CQI/S-PMI |  |  |  |

Referring to Table 4, in the existing wireless communication system, for example, LTE, the channel status information is divided into RI, WB-CQI (wide band-CQI)/PMI, and SB-CQI (subband-CQI), which, in case of an order of a larger transmission period, are arranged in an order of RI, information on a plurality of DL CCs may also be configured per DL CC or per DL CC group.

The user equipment may transmit channel status information on the plurality of DL CCs through one UL CC. At this time, the UL CC may be primary UL CC (UL PCC). In such case, channel status information more than in the existing LTE should be transmitted through one UL CC. Accordingly, a need exists for a method and apparatus of efficiently transmitting channel status information on the plurality of DL CCs through one UL CC.

[First Method of Transmitting Channel Status Information]

Figure 10:
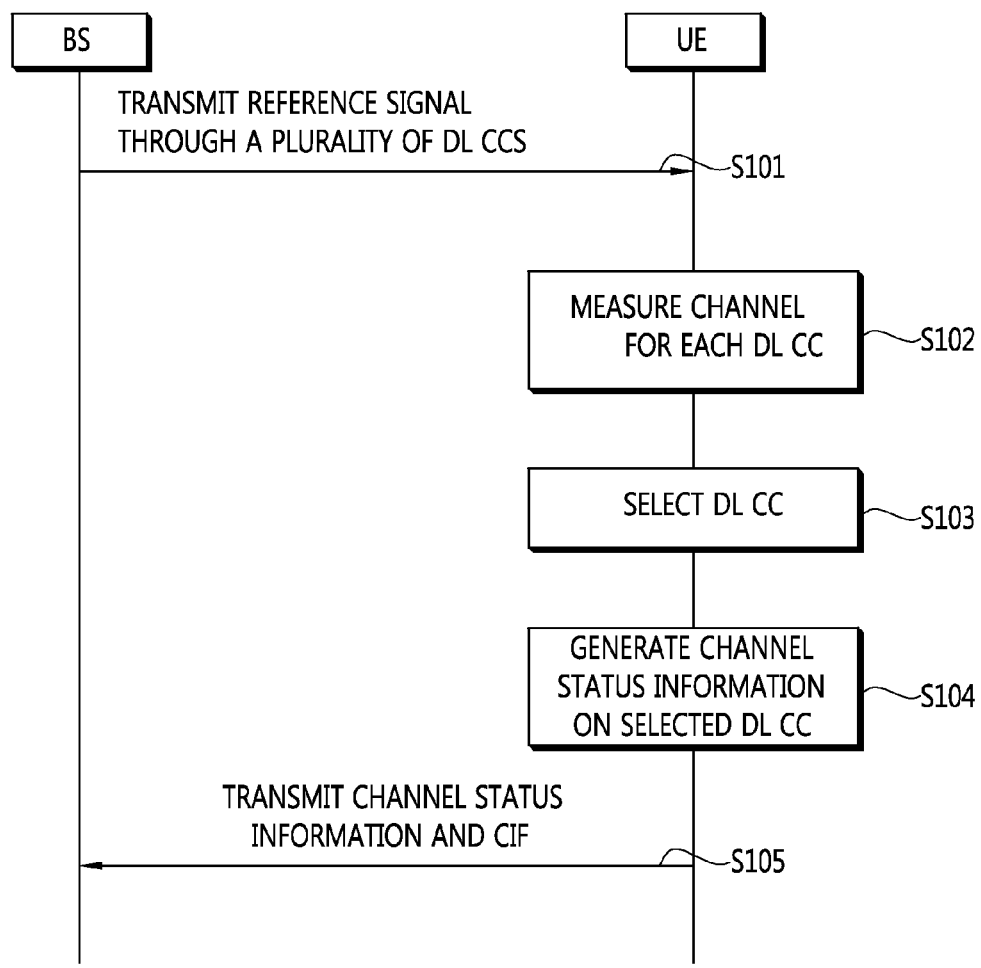
FIG. 10 illustrates a method of transmitting channel status information according to an embodiment of the present invention.

FIG. 10 illustrates a method of transmitting channel status information according to an embodiment of the present invention.

Referring to FIG. 10, the base station transmits a reference signal through a plurality of DL CCs configured in the user equipment (S101). As the reference signal, CRS (cell-specific reference signal), CSI-RS (channel status information RS), and PRS (positioning RS) may be used, but it is not limited thereto.

The user equipment measures the channel on each DL CC by receiving the reference signal through the plurality of DL CCs (S102). The user equipment selects a specific DL CC among the plurality of DL CCs (S103). For example, the user equipment may select the DL CC having the best channel environment among the plurality of DL CCs. The DL CC having the best channel environment may be, e.g., DL CC that has the highest value among values obtained by measuring SNR (signal to noise ratio), SINR (signal to interference plus noise ratio), and RSRP (reference signal received power) of each DL CC.

The user equipment generates channel status information on the selected specific DL CC (S104) and transmits the channel status information and the CIF value to the base station (S105). At this time, the CIF value may include an index indicating the specific DL CC. The channel status information and the CIF value may be transmitted through the primary UL CC. In the case that both the channel status information and the CIF value are transmitted, the CIF value may be joint-coded with the channel status information. For example, after the CIF value is added to the bit stream indicating the channel status information, the same channel coding is conducted, and it may be then transmitted.

Although in FIG. 10 the CIF value, together with the channel status information, is transmitted, the present invention is not limited thereto. That is, the user equipment may also transmit the CIF value independently from the channel status information. In other words, the CIF value may be independently transmitted without being joint coded with the channel status information. Further, the user equipment may transmit the channel status information and the CIF value in the different subframes. In the subframe configured to transmit the CIF value, the user equipment may transmit the CIF value indicating the DL CC having the best channel environment.

As described above, the user equipment feeds back only the CIF value and channel status information on the DL CC having the best channel environment among the plurality of DL CCs, so that the amount of transmission may be reduced compared with conventionally when the channel status information is independently sent with respect to each of the plurality of DL CCs. Further, this method also allows the base station to be aware of which DL CC among the plurality of DL CCs has the best channel environment, so that scheduling is not greatly limited.

[Second Method of Transmitting Channel Status Information]

Figure 11:
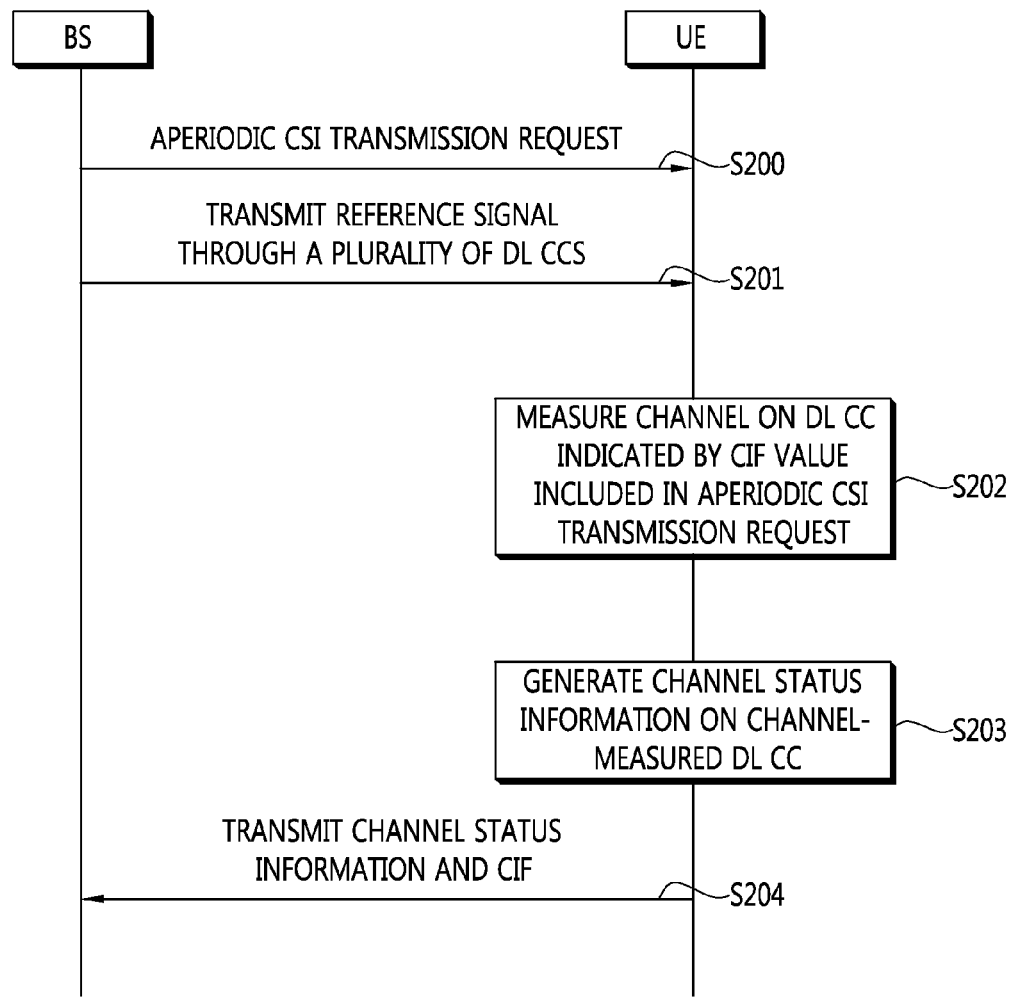
FIG. 11 illustrates a method of transmitting channel status information according to another embodiment of the present invention.

FIG. 11 illustrates a method of transmitting channel status information according to another embodiment of the present invention.

Referring to FIG. 11, the base station requests that the user equipment transmit aperiodic channel status information (CSI) (S200). The base station may request the aperiodic CSI transmission in a manner of transmitting configuration information on the CSI through a higher layer signal, such as a RRC (Radio Resource Control) signal or may request the aperiodic CSI transmission in a manner of triggering using L1/L2 signals. Here, the L1 signal means a physical layer signal, and the L2 signal may mean a MAC (media access control), RLC (radio link control), or PDCP (packet data convergence protocol) layer signal.

In FIG. 11, triggering through the L1 signal is described. In such case, the base station may transmit an uplink grant (UL grant) including a CIF value in the PDCCH of the DL CC monitored by the user equipment and may trigger the aperiodic CSI transmission by using the CIF value.

Further, the base station may transmit the reference signal through a plurality of DL CCs (S201).

Receiving the uplink grant including the CIF value, the user equipment measures the channel on the DL CC indicated by the CIF value (S202) and generates the aperiodic channel status information on the channel-measured DL CC (S203). This process will be described in detail below.

The user equipment transmits the CIF value indicating channel status information and which DL CC the channel status information is for to the base station (S204). The user equipment may transmit the channel status information and the CIF value through the PUSCH of the configured UL CC.

Now, steps S202 and S203 are described in detail.

Figure 12:
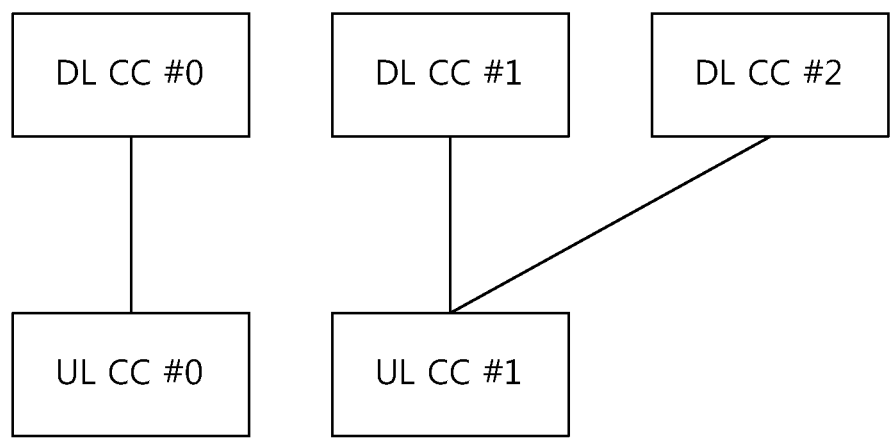
FIG. 12 illustrates an example where a plurality of DL CCs and a plurality of UL CCs are configured in the user equipment.

FIG. 12 illustrates an example where a plurality of DL CCs and a plurality of UL CCs are configured in the user equipment.

Referring to FIG. 12, DL CC#0 to DL CC#2 and UL CC#0 and UL CC#1 may be configured in the user equipment. At this time, assume that UL CC#0 is linked to DL CC#0, and UL CC#1 is linked to DL CC#1 and DL CC#2. In the situation illustrated in FIG. 12, the user equipment may operate as in the following table according to the CIF value included in the uplink grant.

TABLE 5

| | CIF in UL grant | | | | | | | |
|---|---|---|---|---|---|---|---|---|
| | 0 | 1 | 2 | 3 | 4 | 5 | 6 | 7 |
| meaning | DL: 0 UL: 0 | DL: 1 UL: 1 | DL: 2 UL: 1 | NA | NA | NA | DL: BEST UL: 0 | DL: BEST UL: 0 |

As shown in Table 5 above, if the CIF value included in the uplink grant is 0, the user equipment transmits aperiodic CSI for DL CC#0 through UL CC#0 linked to DL CC#0. If the CIF value included in the uplink grant is 1, aperiodic CSI for DL CC#1 is transmitted through UL CC#1 linked to DL CC#1. If the CIF value included in the uplink grant is 2, aperiodic CSI for DL CC#2 is transmitted through UL CC#1 linked to DL CC#2. As such, to be fed back with the aperiodic CSI for a specific DL CC, the base station may transmit the CIF value for the corresponding DL CC, with the CIF value included in the uplink grant.

On the other hand, to be fed back with aperiodic CSI for the DL CC having the best channel environment among the plurality of DL CCs, the base station may use a reserved CIF value other than the CIF value indicating the plurality of DL CCs (for example, in Table 5, the reserved CIF value may be 3 to 7). Among the total reserved CIF values, the number of reserved CIF values used may be the same as the number of UL CCs configured in the user equipment. For example, as the reserved CIF values included in the uplink grant, two reserved CIF values, such as 6 or 7, may be used. The user equipment selects the DL CC having the best channel environment among DL CC#0 to DL CC#2 and transmits the aperiodic CSI for the DL CC through the UL CC. In the above example, the user equipment may transmit the aperiodic CSI through UL CC#0 if the CIF value included in the uplink grant is 6 and through UL CC#1 if 7.

In the above example, two CIF values 6 and 7 are used to indicate which one of the two UL CCs is used to transmit the aperiodic CSI for the DL CC having the best channel environment (hereinafter, 'best DL CC'), but it is not limited and may be changed. For example, the aperiodic CSI for the best DL CC may be configured to be transmitted through only a specific UL CC. At this time, the specific UL CC may be, e.g., a primary UL CC (UL PCC). By this method, when the aperiodic CSI transmission on the best DL CC is indicated, the base station may advantageously use only one CIF value for the uplink grant. For example, rather than two CIF values (6, 7), one CIF value (e.g., 6 or 7) may be advantageously used for the uplink grant.

[Third Method of Transmitting Channel Status Information]

Figure 13:
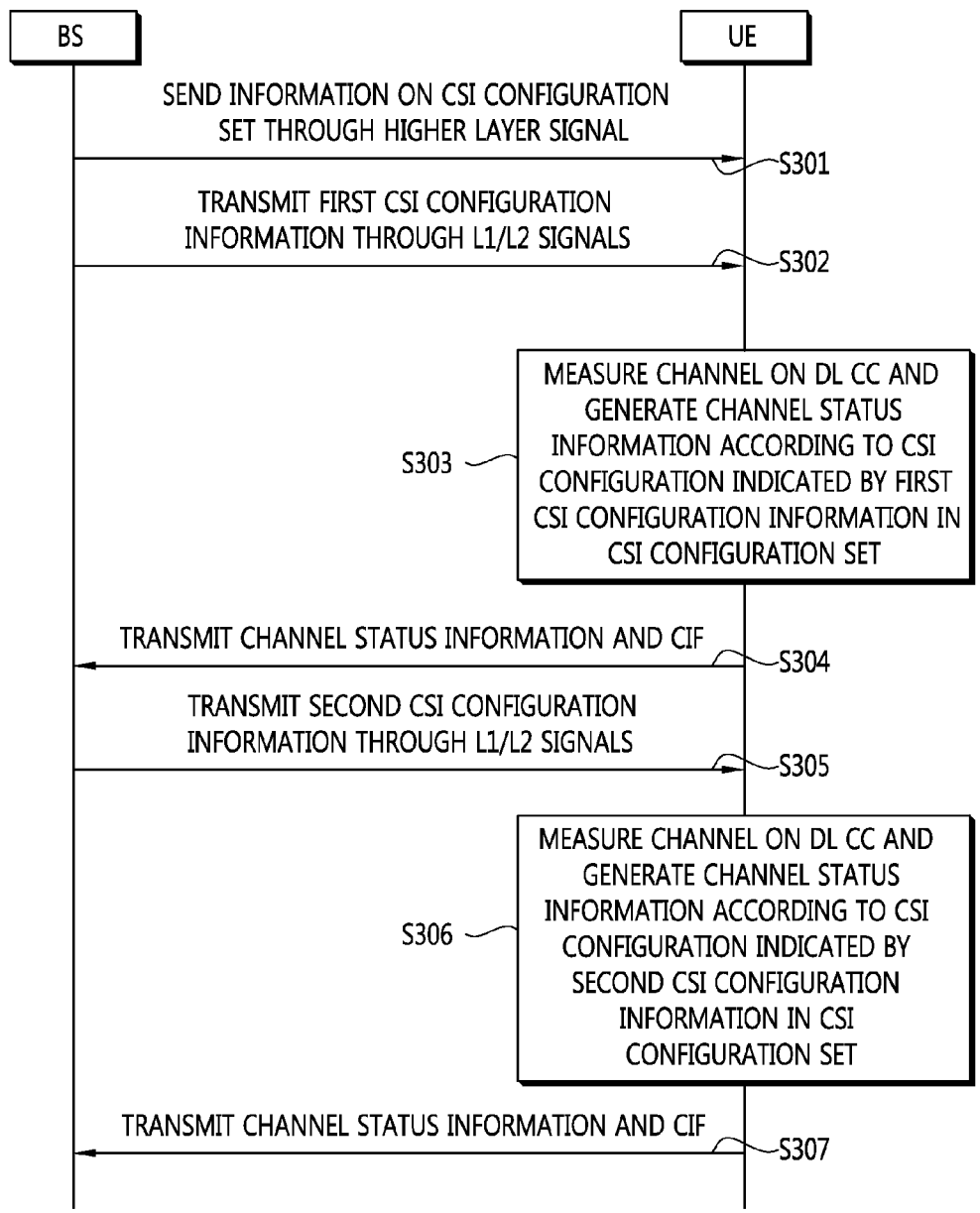
FIG. 13 illustrates a method of transmitting channel status information according to still another embodiment of the present invention.

FIG. 13 illustrates a method of transmitting channel status information according to still another embodiment of the present invention.

Referring to FIG. 13, the base station provides information on a channel status information (CSI) configuration set to the user equipment through an higher layer signal (S301). The higher layer signal is a signal transmitted in a higher layer than the L1/L2 signals, and may be, e.g., a RRC message. The CSI configuration set means a set of a plurality of CSI configurations, and the CSI configuration means notifying the user equipment of configuration on how to transmit CSI through CSI transmission period or offset information of the transmission subframe.

For example, the CSI configuration may indicate a target DL CC of CSI. That is, it may indicate whether CSI for the best DL CC is fed back or CSI for a specific DL CC is fed back. Further, the CSI configuration may include information on the configuration, such as the type of CSI that the user equipment should feed back per DL CC, the amount of information, transmission period, or offset depending on the amount of downlink data transmitted in each DL CC. That is, the base station may notify a plurality of CSI configurations that may apply to the user equipment through information on the CSI configuration set. The CSI configuration set may be determined for each DL CC or each DL CC group.

The base station transmits first CSI configuration information through the L1/L2 signals (S302). The first CSI configuration information indicates which CSI configuration is to be used among CSI configurations included in the CSI configuration set. For example, the base station may dynamically notify which CSI configuration is to be used in the CSI configuration set through a physical layer signal.

The user equipment generates channel measurement and channel status information on the corresponding DL CC according to the CSI configuration indicated by the first CSI configuration information in the CSI configuration set (S303).

The user equipment transmits a CIF value indicating the channel status information and which DL CC the channel status information is for (S304).

The base station transmits second CSI configuration information through the L1/L2 signals (S305). The base station may dynamically change the CSI configuration through the physical layer signal. For example, the base station which has been instructing CSI configuration that feeds back only a CSI type with relatively small overhead, such as WB-CQI or RI, through the first CSI configuration information, may instruct a CSI configuration that feeds back all the CSI types, such as RI, WB-CQI, and SB-CQI, through the second CSI configuration information.

In the conventional method, the base station notifies the user equipment of the CSI configuration through a higher layer signal, such as RRC message, and to change the CSI configuration, notifies the CSI configuration through the higher layer signal again. Accordingly, it is difficult to dynamically change the CSI configuration. On the contrary, in the present invention, a plurality of CSI configurations, i.e., CSI configuration set, applicable to the user equipment are notified through the higher layer signal, and then, the CSI configuration may be changed in the CSI configuration set through a physical layer signal, thereby enabling dynamically changing the CSI configuration.

The user equipment measures the channel on the DL CC and generates channel status information according to the CSI configuration indicated by the second CSI configuration information in the CSI configuration set (S306) and transmits the channel status information and CIF value to the base station (S307).

That is, the above-described channel status information transmission method 3 may notify the CSI configuration set through the higher layer signal, such as RRC signal, and may dynamically change the CSI configuration through the L1/L2 signals. Accordingly, since a plurality of CSI configurations may be changed dynamically per DL CC, the user equipment may adjust CSI feedback overhead per DL CC according to the amount of DL data. For example, in the case that while feedbacks with small overhead, such as wideband CQI or RI remain configured for a specific DL CC, a large amount of downlink data needs to be transmitted through the specific DL CC, dynamic change may be made so that all the types of CSI for the specific DL CC may be fed back.

Figure 14:
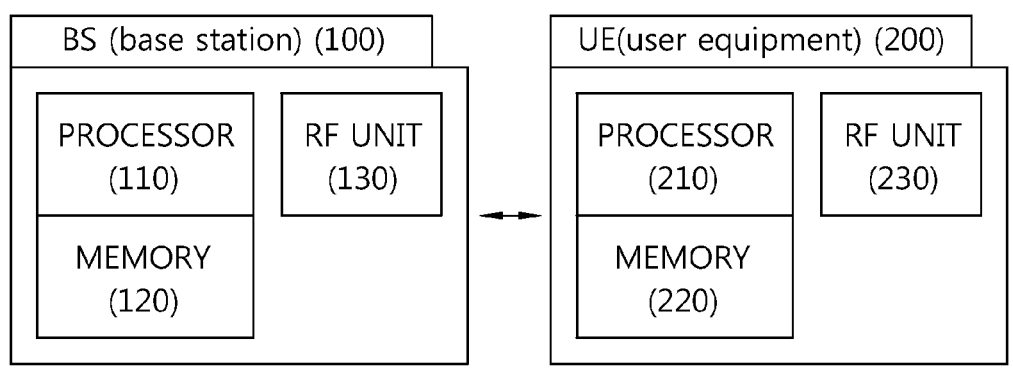
FIG. 14 is a block diagram illustrating a base station and user equipment.

FIG. 14 is a block diagram illustrating a base station and a user equipment.

The base station 100 includes a processor 110, a memory 120, and a RF (Radio Frequency) unit 130. The processor 110 implements a suggested function, process, and/or method. For example, the base station 100 transmits a reference signal through a plurality of downlink component carriers, and receives channel status information fed back from the user equipment. The base station performs scheduling using the channel status information. Further, the processor 110 may transmit information on the CSI configuration set through the higher layer signal, such as RRC, and may transmit CSI configuration through the L1/L2 signals. The memory 120 is connected to the processor 110 and stores various types of information to drive the processor 110. The RF unit 130 is connected to the processor 110 and transmits and/or receives wireless signals.

The user equipment 200 includes a processor 210, a memory 220, and a RF unit 230. The processor 210 implements a suggested function, process, and/or method. For example, the processor 210 receives a reference signal through a plurality of downlink component carriers from the base station and measures a channel status using the reference signal included in each of the plurality of downlink component carriers. The user equipment 200 generates channel status information on some of the downlink component carriers and then transmits to the base station at least one of indexes indicating some downlink component carriers and the channel status information on some downlink component carriers. The memory 220 is connected to the processor 210 and stores various types of information to drive the processor 210. The RF unit 230 is connected to the processor 210 and transmits and/or receives wireless signals.

The processor 110 or 210 may include a converter that converts signals from ASICs (Application-Specific Integrated Circuits), different chipsets, logic circuits, data processing devices, and/or baseband signals and wireless signals to each other. The memory 120 or 220 may include ROMs (Read-Only Memories), RAMs (Random Access Memories), flash memories, memory cards, storage media, and/or other storage devices. The RF unit 130 or 230 may include one or more antennas to transmit and/or receive wireless signals. When the embodiments are implemented in software, the above-described schemes may be implemented in modules (procedures or functions) that perform the above-described functions. The modules may be stored in the memory 120 or 220 and may be executed by the processor 110 or 210. The memory 120 or 220 may be positioned inside or outside the processor 110 or 210, and may be connected to the processor 110 or 210 via various well-known means.

Although the embodiments of the present invention have been described, it will be understood by those skilled in the art that various modifications or variations may be made to the present invention without departing from the technical spirit or scope of the invention. Accordingly, the present invention is not limited to the embodiments and includes all the embodiments within the appended claims.

The invention claimed is:

1. A method of transmitting channel status information of a user equipment in a multi-carrier system, the method comprising:
   receiving a reference signal through a plurality of downlink component carriers from a base station;
   measuring a channel status of each of the plurality of downlink component carriers using the reference signal included in each of the plurality of downlink component carriers;
   selecting a downlink component carrier having a best channel status among the plurality of downlink component carriers;
   generating channel status information on the selected downlink component carrier; and
   transmitting to the base station the channel status information on the selected downlink component carrier and a carrier indication field (CIF) value,
   wherein the channel status information and the CIF value are transmitted through a primary uplink component carrier,
   wherein the channel status information and the CIF value are joint-coded by applying same channel coding to the channel status information and the CIF value,
   wherein the channel status information and the CIF value are transmitted only through a physical uplink shared channel (PUSCH) of the primary uplink component carrier,
   wherein the CIF value is included in an uplink grant, the CIF value indicating the selected downlink component carrier linked to a corresponding uplink component carrier,
   wherein at least two of the plurality of downlink component carriers are linked to a single uplink component carrier,
   wherein a number of reserved CIF values among total reserved CIF values in the uplink grant is same as a number of configured uplink component carriers,
   wherein two highest reserved CIF values in the uplink grant are used to indicate a best channel environment among the plurality of downlink component carriers linked to two of the configured uplink component carriers, and
   wherein a plurality of channel status information configurations are dynamically changed through layer 1/layer 2 (L1/L2) signals per each of the plurality of downlink component carriers according to an amount of downlink data such that transmission overhead of the channel status information is adjusted for each of the plurality of downlink component carriers.

2. The method of claim 1, wherein the reference signal is at least one of a cell-specific reference signal (CRS), a channel status information-reference signal (CSI-RS), and a positioning reference signal (PRS).

3. The method of claim 1, wherein the selected downlink component carrier has a highest value among values obtained by a measuring signal to noise ratio (SNR), signal to interference plus noise ratio (SINR), and reference signal received power (RSRP) of each of the plurality of downlink component carriers.

4. The method of claim 1, wherein the channel status information includes at least one of a channel quality indicator (CQI), a precoding matrix index (PMI), and a rank indicator (RI).

5. A user equipment, comprising:
   a radio frequency (RF) unit configured to transmit and receive a wireless signal; and
   a processor connected to the RF unit,
   wherein the processor is configured to:
      receive, via the RF unit from a base station, a reference signal through a plurality of downlink component carriers,
      measure a channel status on each of the plurality of downlink component carriers using the reference signal included in each of the plurality of downlink component carriers,
      select a downlink component carrier having a best channel status among the plurality of downlink component carriers,
      generate channel status information on the selected downlink component carrier, and
      transmit, via the RF unit to the base station, the channel status information on the selected downlink component carrier and a carrier indication field (CIF) value,
   wherein the channel status information and the CIF value are transmitted through a primary uplink component carrier, and
   wherein the channel status information and the CIF value are joint-coded by applying same channel coding to the channel status information and the CIF value,
   wherein the channel status information and the CIF value are transmitted only through a physical uplink shared channel (PUSCH) of the primary uplink component carrier,
   wherein the CIF value is included in an uplink grant, the CIF value indicating the selected downlink component carrier linked to a corresponding uplink component carrier,
   wherein at least two of the plurality of downlink component carriers are linked to a single uplink component carrier, wherein a number of reserved CIF values among a total reserved CIF values in the uplink grant is same as the number of configured uplink component carriers, wherein two highest reserved CIF values in the uplink grant are used to indicate a best channel environment among the plurality of downlink component carriers linked to two of the configured uplink component carriers, and wherein a plurality of channel status information configurations are dynamically changed through layer 1/layer 2 (L1/L2) signals per each of the plurality of downlink component carriers according to an amount of downlink data such that transmission overhead of the channel status information is adjusted for each of the plurality of downlink component carriers.

6. The user equipment of claim 5, wherein the reference signal is at least one of a cell-specific reference signal (CRS), a channel status information-reference signal (CSI-RS), and a positioning reference signal (PRS).

7. The user equipment of claim 5, wherein the selected downlink component carrier has a highest value among values obtained by a measuring signal to noise ratio (SNR), signal to interference plus noise ratio (SINR), and reference signal received power (RSRP) of each of the plurality of downlink component carriers.

* * * * *